United States Patent [19]

Vollkommer et al.

[11] 4,031,163
[45] June 21, 1977

[54] HARDENABLE RESINS BASED UPON ALLYL COMPOUNDS

[75] Inventors: Norbert Vollkommer, Troisdorf; Werner Trautvetter, Troisdorf-Spich, both of Germany

[73] Assignee: Dynamit Nobel Aktiengesellschaft, Troisdorf, Germany

[22] Filed: Mar. 25, 1975

[21] Appl. No.: 561,717

[30] Foreign Application Priority Data

Mar. 26, 1974 Germany .......................... 2414364

[52] U.S. Cl. .................. 260/837 R; 260/37 EP; 260/836; 260/78.41; 260/DIG. 24
[51] Int. Cl.$^2$ ........................................ C08G 45/04
[58] Field of Search ........... 260/836, 837, DIG. 24, 260/78.4 EP

[56] References Cited

UNITED STATES PATENTS 3,084,137  4/1963  Nowlin et al. ..................... 260/836

OTHER PUBLICATIONS

Journal of Polymer Science Part A–1 vol. 8 (1970) pp. 1557–1570 J. P. Stallings.

*Primary Examiner*—Theodore E. Pertilla
*Attorney, Agent, or Firm*—Burgess, Dinklage & Sprung

[57] ABSTRACT

A cross-linked polymer having units of a residue of a chlorinated xylyleneglycolbisallylether, units of a residue of maleic acid anhydride and units of a residue of an epoxy compound; an improvement in a process for the preparation of a cross-linked hardenable resin wherein a composition comprising a chlorinated or brominated xylyleneglycolbisallylether and maleic acid anhydride is subjected to a preliminary setting process and thereafter cured wherein the composition contains an epoxy compound; shaped objects of the polymer especially when formed by the described process having good flame self-extinguishing properties and good thermal stability of shape.

37 Claims, No Drawings

HARDENABLE RESINS BASED UPON ALLYL COMPOUNDS

BACKGROUND OF THE INVENTION

1. Field of the Invention

This invention relates to the preparation of hardenable cross-linked resins. More especially, this invention relates to a hardenable cross-linkable resinous composition consisting essentially of at least one chlorinated or brominated xylyleneglycolbisallylether which has been chlorinated in the nucleus, a maleic acid anhydride and an epoxy compound. This invention is particularly directed to improving the preparation of cross-linked hardenable resins from nucleus chlorinated or brominated xylyleneglycolbisallylethers and maleic acid wherein the resin is modified by the inclusion of an epoxy compound. This invention is particularly directed to formed articles of such a cross-linked polymer having high thermal stability of shape and having excellent flame self-extinguishing properties.

2. DISCUSSION OF THE PRIOR ART

The bisallylethers of xylyleneglycols which have been chlorinated or brominated in the nucleus have been known. These can be prepared, for example, by the procedure described by Stallings et al. (J. Polymer Sci. A-1 (1970), 8, p. 1557). A similar procedure can be used in the preparation of the nonhalogenated bisallylethers.

In the article there is described the reaction of tetrachloro-p-xylyleneglycolbisallylether with maleic acid anhydride employing the composition in a molar ratio of 1:1. The reaction is carried out in the presence of di-tert.-butylperoxide at 95° C and forms a clear, hard copolymer. The copolymer is apparently one in which a sizeable percentage of the maleic acid anhydride is not completely incorporated therein since 40% of the maleic acid anhydride content could be dissolved out of the copolymer by extraction with water.

Recent experiments have revealed that it is difficult to control the cross-linking polymerization of tetrachloroxylenebisallylethers maleic acid anhydride. For instance, when such a resinous composition is subjected to cold hardening no product is formed unless the composition is heated at a temperature up to about 80° C. It is only at this temperature employing equivalent amounts of maleic acid anhydride and bisallylether that a clear melt is formed. This melt solidifies immediately upon cooling to 70° C.

Attempts have been made to form articles by use of a hot setting process by subjecting the composition to temperatures ranging around 80° C in the presence of radical formers. Unfortunately, the cross-linking polymerization is highly exothermic and as a rule is so violent even at the commencement of a reaction that a considerable temperature rise is experienced. The rise in temperature is so great that decomposition of the resin occurs resulting in foaming and great discoloration.

To make useable castings, the uncontrollable setting will have to be controlled either by intense external cooling of the molds or by use of a smaller quantity of initiator, e.g., about 0.01% by weight. Another alternative lies in performing the process without the use of radical formers, but such process requires setting times in excess of 10 hours. None of the foregoing methods are easy to practice on a technical or commercial scale.

The foregoing is unfortunate inasmuch as hardened castings made from tetrachloro-p- or m-xylyleneglycolbisallylethers and maleic acid anhydride (molar ratio 1:2) when shaped and set at a temperature of 80° C and cured at 140° C to have good mechanical characteristics. The Martens thermal stability as measured on a standard specimen is 130°–140° C on the basis of ISO/R 75 A, a thermal stability of shape of 145° to 160° has been found. The bending strength of such a formed article can be 500 to 700 kp/cm² and the impact toughness ranges from 5 to 7 cm.kp/cm² as measured on the standard specimen. However, it has been found that the resistance of the castings to hydrolysis is quite poor. When the castings are left in water at 100° C cracks form within 48 hours. When a sample is left in a normal aqueous caustic soda solution at 100° C is completely destroyed.

It has therefore become desirable to provide an improved hardened or cast article of a cross-linked resin having components of a tetrachloro-p or m-xylyleneglycolbisallylether and maleic acid anhydride. It has also become desirable to provide an improved process for obtaining such material which obviates the necessity to control the cross-linking polymerization during the setting process. Stated differently, it has become desirable to provide a controlled process for the preparation of cross-linked polymers of such nuclearly halogenated xylyleneglycolbisallylethers or ether containing polymers. More especially, it has become desirable to provide a process for the controlled preparation of such composition which process provides an improved composition-improved in respect of hydrolysis resistance and resistance to aqueous caustic solutions.

SUMMARY OF THE INVENTION

The objects of the invention are accomplished by an improved cross-linked polymer composition which improved cross-linked polymer composition comprises a cross-linked polymer having (in percent by weight):

1. Between 22 and 76 units of a residue of a nuclearly chlorinated or brominated xylyleneglycolbisallylether;
2. Between 11 and 54 units of a residue of maleic acid anhydride; and
3. Between 6 and 57 units of a residue of an epoxy compound.

In accordance with the invention it has been discovered that when a hardenable resinous composition containing nuclearly brominate or chlorinated xylyleneglycolbisallylethers and maleic acid anhydride is initially preset and thereafter cured, the resultant composition can be improved with respect to hydrolysis resistance and resistance to caustic soda if the composition also includes an epoxy compound. It has also been found that by including an epoxy compound in the resinous composition that the preliminary setting and subsequent curing process can be conducted conveniently and no special steps are required to control the cross-linking polymerization.

The chlorinated and/or brominated bisallylethers which can be employed in the present invention are typified by such allylethers of 2-chloro-p-xylyleneglycol, of 2,5-dichloro-p-xylyleneglycol of 2,3,5-trichloro-p-xylyleneglycol and of tetrachloro-p-xylyleneglycol as well as the corresponding ortho and meta compounds and the corresponding bisallylethers of brominated compounds wherein the bromination has occurred in the nucleus of the compounds. Mixtures of bisallylethers of different degrees of chlorination and bromination in the nucleus can also be used in accordance with the invention. The meta and para xylyleneglycols are preferred since they are generally easily more accessible than the corresponding ortho compounds.

In accordance with the particularly preferred embodiment of the present invention 2,3,4,6-tetrachloro-m-xylyleneglycolbisallylether and/or 2,3,5,6-tetrachloro-p-xylyleneglycolbisallylether are used as the chlorinated or brominated xylyleneglycolbisallylether.

While not wishing to be bound by any theory, it is theorized that in the setting process the carbon-to-carbon double bond of the bisallylether react with the maleic acid anhydride double bond in the framework of a radical-cross-linking copolymerization. This occurs in an initial stage of the reaction and it is followed by a second stage in which the anhydride groups from the maleic acid anhydride react with the epoxide groups supplied by the epoxy-containing compound resulting in an esterification. Although the epoxy compound can be used in amounts which are far less than the amount nnecessary to maintain equivalents with respect to the anhydride groups and although, as the infrared spectrum of the fully set casting shows, varying percentages of the anhydride groups remain unaltered depending upon setting conditions even if equivalent amounts of epoxide and anhydride groups are used, the epoxy modification decidedly improves the resistance of the resin or casting to hydrolysis and to alkali resistance. Stated differently, it has been found for some surprising reason that the epoxy compound need not consume all of the anhydride groups supplied with the maleic acid anhydride. The epoxy compounds can be present in a stoichiometric excess or in a stoichiometric deficiency based on the maleic acid compound. In any event, the epoxy compound so modifies the composition that it has vastly improved properties especially with respect to hydrolysis resistance.

For instance, it has been found that a set casting made by a preliminary setting process followed by curing of the mixture of 356 parts by weight of 2,3,4,6-tetrachloro-m-xylyleneglycolbisallylether, 196 parts by weight of maleic acid anhydride and 250 parts by weight of diglycidyl ether of bisphenol A shows, after 48 hours of standing in a normal aqueous caustic soda solution at 100° C no alteration of the surface nor any marked impairment in its mechanical properties. It can also withstand being placed in water and maintained at 100° C for 14 days without any surface alteration or marked impairment of its mechanical properties.

Another advantage of the resin composition of the invention prepared from the components tetrachlororylylene-glycolbisallylether, maleic acid anhydride and an epoxy compound consists in problem-free hardening. Since the epoxy compound acts as a diluent in the radical-cross-linking copolymerization, the hardening takes place speedily, even without any measures for temperature control (removal of the reaction heat), but in a controlled manner, even in the production of castings of great wall thickness. No overheating and decomposition of the hardening resin mixture occurs as it does in the tetrachloroxylyleneglycolbisallylether-maleic acid anhydride system.

A further advantage of the resin formulas of the invention is that the mixtures can easily be set even cold by the use of a radical former and an accelerator, such as for example dibenzoylperoxide + dimethylaniline or methylethylketonehydroperoxide + cobalt octoate. In contrast to the resin composition containing no epoxy, the melted mixtures of the invention remain in the liquid state over a period of time sufficient for cold setting. The course of the hot or cold setting of the mixtures of the invention is approximately the same as that of a styrene solution of an unsaturated polyester resin.

Furthermore, castings which are made from the mixtures of the invention based on a xylyleneglycolbisallylether chlorinated or brominated in the nucleus, maleic acid anhydride and an epoxy compound have substantially better thermal and mechanical characteristics than those made without the use of an epoxy compound. For example, a casting made from 356 parts by weight of 2,3,4,6-tetrachloro-m-xylyleneglycolbisallylether, 196 parts maleic acid anhydride and 150 parts bisphenol A diglycidyl ether (without fillers or reinforcing materials), set at 80° to 120° C with dibenzoyl peroxide and cured in the 180° to 200° C temperature range, has a thermal stability of shape in accordance with ISO/R 75 A of 195° to 205° C, and a Martens thermal stability of shape (measured on the small standard bar) of 180° to 190° C, and therefore a thermal stability of shape that is approximately 50° C higher than castings made exclusively from the same bisallylether and maleic acid anhydride in an analogous manner. The bending strength of a casting made from the resin formulations of the invention is 1500 kp/cm$^2$ and the impact toughness (measured on the small standard bar) is 13 to 14 cm.kp/cm$^2$ while the bending strength and the impact toughness of a casting made without the use of an epoxy compound are only half as great.

The outstanding properties of the fabricated products of the invention can be understood by comparing them with a styrene-cross-linked unsaturated polyester resin of high thermal stability of shape prepared from neopentylglycol (0.7 mole), ethylene glycol (0.25 mole), tetrachloro-m-xylyleneglycol (0.05 mole), terephthalic acid (0.36 mole), isophthalic acid (0.04 mole) and the fumaric acid (0.6 mole), which in the cured state has a Martens thermal stability of shape (as measured on the small standard bar) of 124 to 130° C and a thermal stability of shape on the basis of ISO/R 75 A of 140° to 150° C, a bending strength of 900 to 1100 kp./cm$^2$, and an impact toughness (as measured on the small standard bar) of 6 to 8 cmkp/cm$^2$, or by comparing them with an epoxy resin hardened with endomethylenetetrahydrophthalic acid anhydride (and obtainable commercially under the name Araldit F), which has a Martens thermal stability of shape of 125° C, a bending strength of 1350 kp/cm$^2$ and an impact toughness of 15 cmkp/cm$^2$. In no case is the excellence of the overall characteristics of the fabricated products of the invention equalled.

DESCRIPTION OF PREFERRED EMBODIMENTS

The cross-linked polymers of the invention have generally between 22% and 76% by weight units of a residue of a chlorinated or brominated xylyleneglycolbisallylether, preferably between 35% and 67% b.w. such units; between 77% and 54% b.w. units, preferably between 77% and 38% b.w. units of a residue of maleic acid anhydride and between 6% and 57% b.w. units, preferably between 73% and 40% b.w. units of a residue of an epoxy compound.

While not wishing to be bound by any theory, it is believed that the cross-linked polymers have a structural formula as follows:*

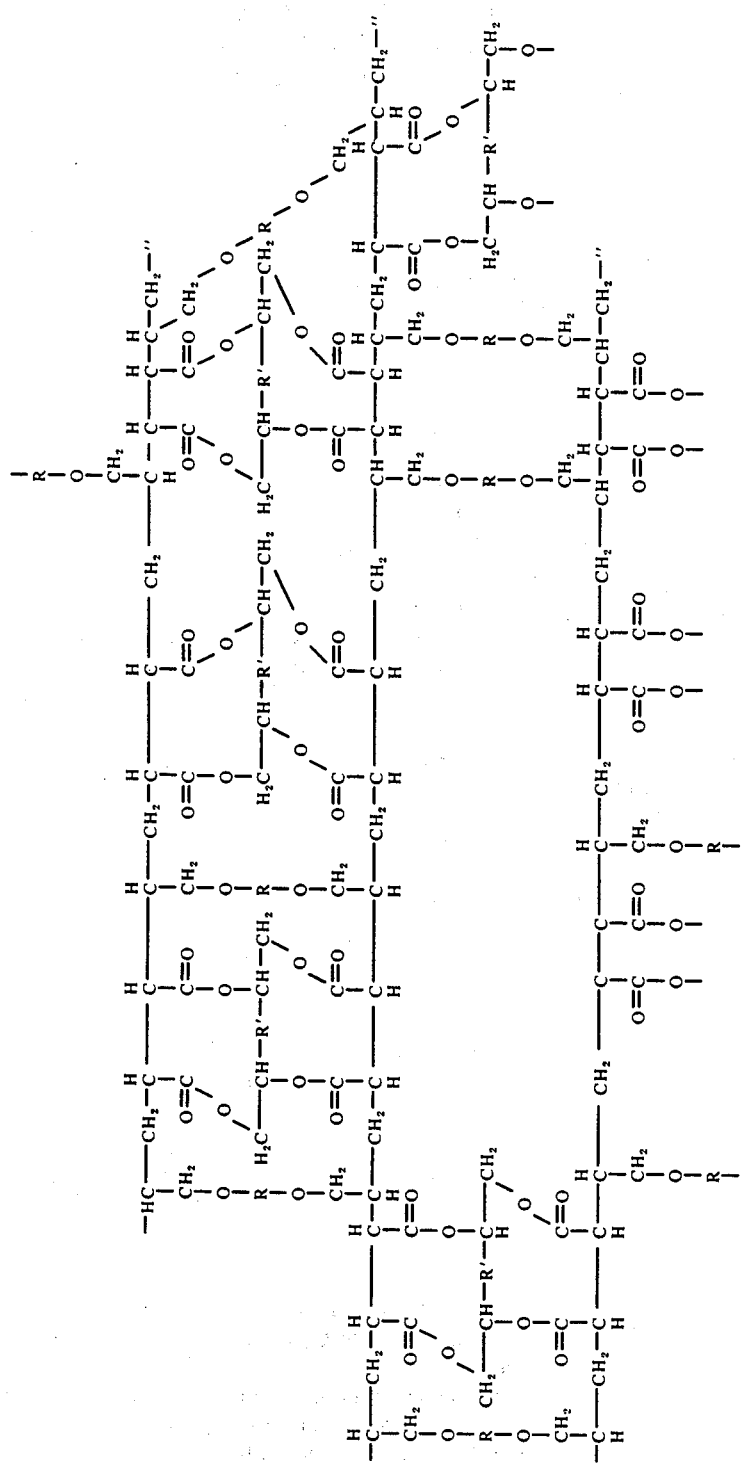

The polymers are insoluble and unmeltable.
* wherein

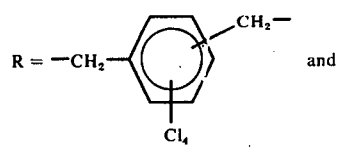 and

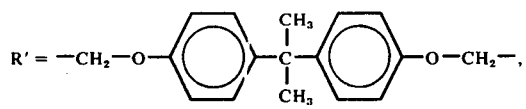

for example.

The cross-linked polymers can be prepared utilizing a composition which comprises:

As component A a chlorinated or brominated xylylene glycolbisallylether which is present in an amount of between 200 and 500 parts by weight, preferably 300 to 400 parts by weight;

As component B the maleic acid anhydride present in an amount of 100 to 300, preferably 150 to 200 parts by weight; and As component C between 50 and 400, preferably between 100 and 300 parts by weight of an epoxy compound.

The composition can also contain especially after preliminary setting has occured between 0.2 and 6 weight percent, based upon the combined weights of the xylyleneglycolbisallylether, maleic acid anhydride and epoxy compound of a radical forming agent such as dibenzoyl peroxide or methyl ethyl ketone hydroperoxide. Additionally the composition can also contain between 0.02 and 0.5 weight percent of an accelerator such as dimethylaniline or cobalt octoate.

Not only compounds which contain only one epoxy group but also those which contain two or more epoxy groups are suitable as the epoxy compounds. Particularly suitable are bifunctional or polyfunctional epoxy compounds, such as bis-glycidyl ethers or esters or trisglycidyl ethers or esters, or other common commercial epoxy resins of higher molecular weight. Mixtures of a variety of epoxy compounds can also be used.

Diglycidyl ethers of bivalent, polynuclear or mononuclear phenols or of polyvalent alcohols are used preferentially in accordance with the invention. The following are named as examples:

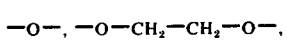

wherein Q

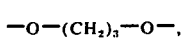

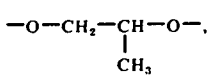

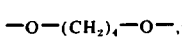

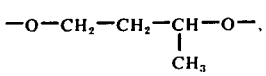

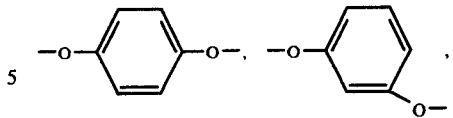

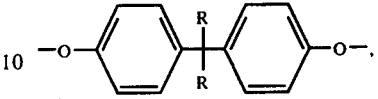

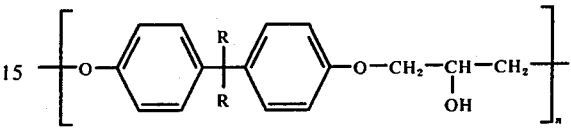

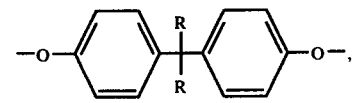

wherein $n = 1$ to 15,

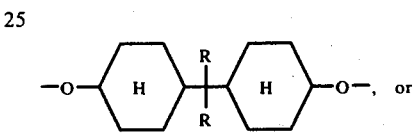, or

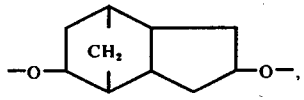

and the like.

Diepoxides having two epoxy groups obtained by the oxidation of double bonds can also be used, such as for example compounds of the formulas:

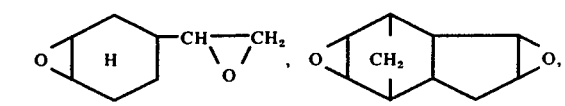

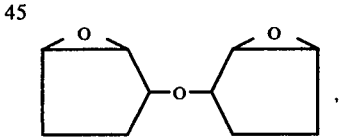

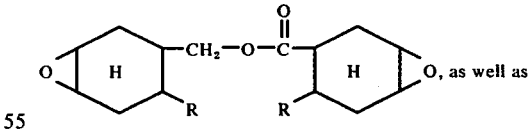, as well as

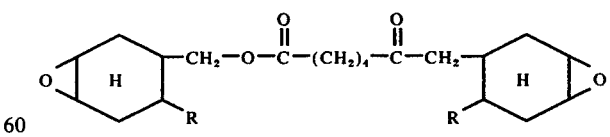

wherein R is hydrogen or a saturated, branched or unbranched $C_1$ to $C_6$ alkyl radical or a cycloalkyl radical.

In those formulas which contain a bisphenol-A grouping or in the case of bisphenol-A itself, the radicals R can also be closed to form a 6-member cycloalkyl ring. The diglycidyl esters of phthalic acid or tetrahydrophthalic acid can also be used as epoxy compounds.

Cast or formed articles of the cross-linked polymer can be prepared, in accordance with the invention, by initially melting the three component composition, for example, at a temperature of 60° to 80° C. Thereafter, the initiator and additionally, should the occasion arise, the accelerator can be added and the composition can be formed into the desired shape. Hardening is thereafter effected in the usual manner. The resin forming components can also be melted in the presence of conventional additives, such as stabilizers, inert fillers, flame-proofing agents and the like, if desired. If desired, the additives can also be added to the melted components.

The radical formers cited in the literature for polymerization reactions can be used as radical initiators, especially peroxides or azo compounds. The preliminary serting, in which substantially the double bonds present in the system react with cross-linking copolymerization, is advantageously performed, in the case of hot setting, in the temperature range between about 50° and 120° C. The curing, in which substantially the epoxy groups react with the anhydride groups, is performed preferably in the temperature range of about 150° C to 230° C.

The resin forming components can be fabricated without difficulty together with fillers such as powdered quartz or other granulated inorganic silicate substances or with granulated grits such as heavy spar and the like, and/or with reinforcing materials such as glass fabrics or glass fibers. When inorganic silicate materials are used, the excellent adhesion of the resin to such substances has a very positive effect.

The mixtures in accordance with the invention, in which xylyleneglycolbisallylethers of a high degree of chlorination or bromination in the nucleus are used, can be fabricated into flameproof products without the addition of flameproofing agents in most cases. For example, the resin prepared on the basis of 356 weight-parts of tetrachloroxylyleneglycolbisallylether, 196 weight-parts of maleic acid anhydride and 250 weight-parts of bisphenol-A-diglycidyl ether, and hardened, is surprisingly self-extinguishing in spite of a content of only about 18 weight-percent of organically bound chlorine. In the UL test (test for flame resistance by a method standardized by the Underwriters Laboratories) it achieves a rating of SE 1.

A portion of the xylyleneglycolbisallylethers chlorinated or brominated in the nucleus, used in accordance with the invention, can be replaced by a p- and/or m- and/or o-xylyleneglycolbisallylether which is not chlorinated or brominated in the nucleus. In this case, however, it is desirable that the content of the xylyleneglycolbisallylether that is not halogenated in the nucleus not exceed approximately 50% of the weight of resin component A. This is because it has been found surprisingly that when the xylyleneglycolbisallylether serving as component A is completely replaced with m- or p-xylyleneglycolbisallylether, hardening as described above will result in a resin of only moderate thermal stability of shape (Martens stability ranging from 90° to 110° C and ISO/R 75 A stability ranging from 115° to 135° C) and very poor impact roughness (ranging from 2.2 to 3.9). The higher thermal stability of shape of the tetrachloroxylyleneglycolbisallylether resin might be explained by the greater stiffness and rigidity of the allylether segments due to the bulky halogen substituents, but not the substantially higher impact toughness. The circumstances that not only the thermal stability of shape but also the impact toughness is decidedly improved could not have been foreseen.

In order to more fully illustrate the nature of the invention and the manner of practicing the same the following examples are presented:

EXAMPLES

EXAMPLE 1— Preparation of the tetrachloroxylyleneglycolbisallylether

In a 2-liter three-necked flask equipped with stirrer and reflux condenser 750 ml of allyl alcohol were placed. While a current of nitrogen was passed through, 88 g (2.2 moles) of sodium hydroxide were added portion-wise, with stirring, and dissolved at approximately 50° C. At the same temperature, 312 g (1 mole) of 2,3,4,6-tetrachloro-m-xylylenedichloride was added. Then the mixture was heated to 130° C (bath temperature) and refluxed for 4 hours. Then 580 ml. of allyl alcohol was distilled off, the cooled residue was diluted with 500 ml. of acetone, and the reaction product was precipitated by pouring the acetone solution in water. It was suction filtered, washed with water to free it of NaCl, and reprecipitated from acetone in water to refine it. After drying, 321 g of 2,3,4,6-tetrachloro-m-xylyleneglycolbisallylether was obtained. Yield: 90% of the theory. Melting point: 55° C to 56° C.

By the same procedure, 309 g of 2,3,5,6-tetrachloro-p-xylyleneglycolbisallylether was prepared from 312 g (1 mole) of 2,3,5,6-tetrachloro-p-xylylenedichloride. Yield: 87% of the theory. Melting point: 86°–88° C.

EXAMPLE 2

71 g of 2,3,4,6-tetrachloro-m-xylyleneglycolbisallylether, 40 g of maleic acid anhydride and 50 g of bisphenol-A diglycidyl ether was melted together at 70° to 80° C, and 3.28 g (2% of the weight of the resin mixture) of dibenzoyl peroxide paste (a 50% paste) was stirred into the melt. The clear, fluid melt was poured into a mold and set for 1.5 h at 85° C and 1 h at 100° C. Then the temperature was increased over a period of 1 hour to 200° C and the casting was cured at this temperature for 2 hours. After removal of the mold, a transparent, honey-yellow plate 4 mm. thick was obtained, which had the following characteristics:

| | |
|---|---|
| Ball impression hardness, 10 sec. | 1950 kp/cm$^2$ |
| Vicat temperature | >220° C |
| Thermal stability of shape, | |
| Martens[1] | 183° C |
| ISO/R 75 A | 201° C |
| Bending strength | 1173 kp/cm$^2$ |
| Impact toughness[1] | 12 cmkp/cm$^2$ |

[1]Tested on the small standard bar.

In the UL test, the casting provided to be self-extinguishing (Rate SE 1) even though the material contained approximately 18% organically bound chlorine by weight.

The infrared spectrum showed, in addition to an anhydride function that is still present (C=O valence vibration at 1830 cm$^{-1}$), a strong ester-carbonyl absorption at 1715 cm$^{-1}$ indicating the reaction of the epoxide groups with the anhydride groups.

The weight loss of the set resin as measured on the thermal scale (air atmosphere; heating rate 8° C/min)

amounted to 1% at 293° C, 5% at 334° C and 10% at 354° C.

Small standard bars were soaked in water at 100° C and in normal aqueous soda solution at 100° C. After 14 days of soaking in hot water, the surface of the small standard bars showed no alteration. The weight increase was 3.34%, the thermal stability of shape on the basis of ISO/R 75 A was 186° C and the impact toughness was 13.1 cmkp/cm².

After 48 hours of standing in the hot caustic soda lye the surface of the small standard bars still showed no alteration. The weight increase was 7.4%, the thermal stability of shape according to ISO/R 75 A was 167° C and the impact toughness was 13.7 cmkp/cm². Roughening and scaling of the surface did not occur until it remained in a hot caustic soda solution for 72 hours. This was combined with a loss of weight from the standard bars.

EXAMPLE for Purposes of Comparison (without epoxy modification)

71 g of g of 2,3,4,6-tetrachloro-m-xylyleneglycolbisallylether and 39 g of maleic acid anhydride were mixed together and melted at 90° C. 0.1 weight percent of dibenzoyl peroxide paste (50% dibenzoyl peroxide) was added, and the clear melt was poured into a mold preheated to 70° C. The mold was immersed into an oil bath heated to 80° C to set the composition. As soon as incipient jelling was signaled by an increase in the viscosity of the casting resin approximately one hour later, the mold was immersed in an oil bath of a temperature of 50° C for external cooling to prevent an excessive temperature rise due to the exothermic setting process, which would result in a decomposition of the resin causing it to foam up. If the resin has jelled after another hour at 50° C, the temperature is increased to 80° and maintained at that level for 2 hours, and then the resin is cured for 2 hours at 140° C to complete the cross-linking copolymerization. The mold was opened and a transparent plate 4 mm. thick was obtained having the following characteristics:

| | |
|---|---|
| Ball indentation hardness, 10 sec. | 1850 kp/cm² |
| Vicat temperature | >200° C |
| Martens thermal stability of shape* | 136° C |
| ISO/R 75 A thermal stability | 158° C |
| Bending strength | 570 kp/cm² |
| Impact toughness | 6.8 cmkp/cm² |

*Tested on standard small bar.

In the UL test, the material proved to be self-extinguishing (Rating SE 1). The weight loss determined on the thermal scale (air atmosphere; heating rate 8° C per min.) were 1% at 285° C, 5% at 326° C and 10% at 345° C.

Small standard bars were let stand in water at 100° C and in normal aqueous caustic soda solution at 100° C. While the surface of the castings crazed after only 48 hours in hot water, the bars had completely disintegrated after 17 hours of standing in the soda lye.

The superiority of the resin formula containing bisallylether, maleic acid anhydride and epoxy over the one consisting of bisallylether and maleic acid anhydride is thus clearly shown by Example 2. A substantial improvement in thermal stability of shape, bending strength and impact toughness is attained, plus a decided improvement in resistance to hydrolysis.

EXAMPLE 3

71.2 g of 2,3,4,6-tetrachloro-m-xylyleneglycolbisallylether, 39.2 g of maleic acid anhydride and 68 g of bisphenol A-diglycidyl ether were melted together at 70° C, 3.6 g of dibenzylperoxide paste (50% dibenzylperoxide) was mixed in, and the clear melt was poured into a mold. It was set for 1 hour at 90° C and the temperature was raised over a period of 1 hour at 200° C and maintained at that level to cure it. The mold was opened and a transparent, yellowish plate 4 mm. thick was obtained having the following characteristics:

| | |
|---|---|
| Vicat temperature | 220° C |
| Thermal stability of shape | |
| Martens* | 153° C |
| ISO/R 75 A | 170° C |
| Bending strength | 1220 kp/cm² |
| Impact toughness* | 14.8 cmkp/cm² |

*Measured on the small standard bar.

In the UL test, the casting proved to be self-extinguishing (Rating SE 1), although the resin contained only about 16% by weight of organically bound chlorine.

Small standard bars, when let stand in water or in normal aqueous caustic soda solution at 100° C, had a slightly higher resistance to hydrolysis than those from Example 2. When they were immersed in hot water for three weeks, their surface showed no alteration and the water absorption after this period amounted to only 3.1% by weight. After 72 hours in hot soda lye the surface still showed no alteration and the weight increase is 8.8%

EXAMPLE 4

71 g of 2,3,4,6-tetrachloro-m-xylyleneglycolbisallylether, 40 g of maleic acid anhydride and 30 g of diglycidyl ether of bisphenol A were melted together at 70° C and 2.8 g of a 50% paste of dibenzoyl peroxide was added and the clear resin mixture was poured into a mold. Then it was set for 2 hours at 80° C and 2 hours more at 100° C. The temperature was raised to 200° C for curing and the casting was cured for 2 hours at 200° C. The mold was opened and a transparent plate 4 mm. thick was obtained having the following characteristis:

| | |
|---|---|
| Vicat temperature | >220° C |
| Thermal stability of shape | |
| Martens* | 182° C |
| ISO/R 75 A | 201° C |
| Bending strength | 1504 kp/cm² |
| Impact toughness* | 13.7 cmkp/cm² |

*Tested on the small standard bar.

The cast resin plate was self-extinguishing (SE 0 in the UL test) and in spite of the small epoxy content in relation to the amount of maleic acid anhydride put in (the molar ratio of anhydride to epoxy groups is 1:0.44) it had approximately the same resistance to hydrolysis as the cast resin plate of Example 2.

EXAMPLE 5

65 g 2,3,5,6-tetrachloro-p-xylyleneglycolbisallylether, 35 g of maleic acid anhydride and 50 g of the commercial epoxy resin, "Araldit GY 280" derived from bisphenol A and epichlorohydrin whose epoxy-equivalent weight is 225 to 280 grams per equivalent, were melted together and 3.5 g of a 50% dibenzoyl peroxide paste was mixed in and the resin was poured into a mold. It was set for 2 hours at 80° C and cured for 2 hours at 180° C. After the mold was opened, a transparent plate 4 mm. thick was obtained having the following mechanical characteristics:

| Vicat temperature | >220° C |
|---|---|
| Thermal stability of shape pursuant to ISO/R 75 A | 187° C |
| Bending strength | 947 kp/cm² |
| Impact toughness* | 9.5 cmkp/cm² |

*Tested on the small standard bar.

EXAMPLE 6

35.6 g of 2,3,4,6-tetrachloro-m-xylyleneglycolbisallylether, 35.6 g of 2,3,5,6-tetrachloro-p-xylyleneglycolbisallylether and 39.2 of maleic acid anhydride and 30 g of the commercial epoxy resin, "Araldit GY 250", derived from bisphenol A and epichlorohydrin whose epoxy-equivalent weight is 180 to 194 g/equiv., were melted together and 3 g of a 50% paste of dibenzoyl peroxide is stirred into the mixture. The resin was set for 2 hours at 85° C and 2 hours at 100° C in a mold, and then cured for 2 hours at 200° C. When the mold was opened a transparent plate 4 mm. thick was obtained having the following characteristics:

| Vicat temperature | >220° C |
|---|---|
| Thermal stability of shape pursuant to ISO/R 75 A | 220° C |
| Bending strength | 1376 kp/cm² |
| Impact toughness* | 12.3 cmkp/cm² |

*Tested on the small standard bar.

EXAMPLE 7

After the melting of a resin mixture of the same composition as in Example 6, 60 g of quartz powder (30% by weight) was stirred in and, after the addition of 4 g of a 50% dibenzoyl peroxide paste, it was poured into a mold and set and cured the same as in Example 6. When the mold was opened an opaque 4 mm. thick plate was obtained having the following characteristics:

| Vicat temperature | 220° C |
|---|---|
| Thermal stability of shape pursuant to ISO/R 75 A | 219° C |
| Bending strength | 1160 kp/cm² |
| Impact toughness* | 10.5 cmkp/cm² |

*Tested on the small standard bar.

Generally the preliminary setting process is carried out at a temperature between 50° and 120° C for a period of time between 0.5 and 5 h. The curing is typically carried out at a temperature between 150° and 230° C for between 1 and 7 h.

What is claimed is:

1. A cross-linked polymer having (in percent by weight):
   a. Between 22 and 76 units of a residue of a nuclearly brominated or chlorinated xylyleneglycolbisallylether;
   b. Between 11 and 54 units of a residue of maleic acid anhydride;
   c. Between 6 and 57 units of a residue of a 1,2 epoxy compound.

2. A cross-linked polymer according to claim 1 having a fire rating of SE 1.

3. A cross-linked polymer according to claim 1 wherein said epoxy compound is a diglycidyl ether of a bivalent mono or polynuclear phenol or a polyvalent alcohol.

4. A polymer according to claim 3 wherein said epoxy compound has the formula

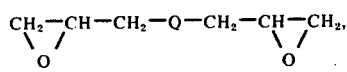

wherein

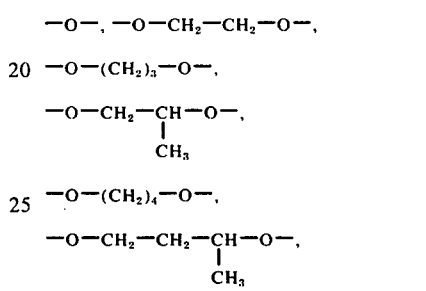

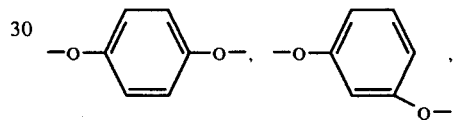

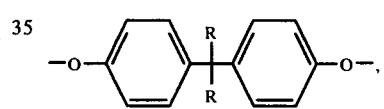

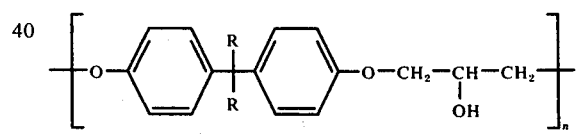

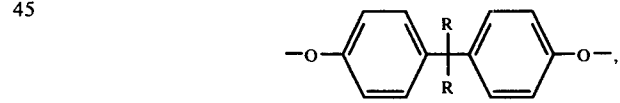

wherein $n = 1$ to 15,

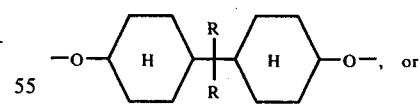

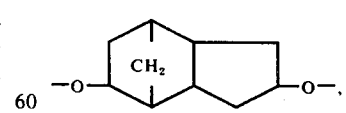

R = H, $C_1$–$C_6$ alkyl or cycloalkyl.

5. A cross-linked polymer according to claim 3 wherein said epoxy compound is a diepoxy compound having two epoxy groups.

6. A cross-linked polymer according to claim 5 wherein the epoxy compound is selected from the group consisting of

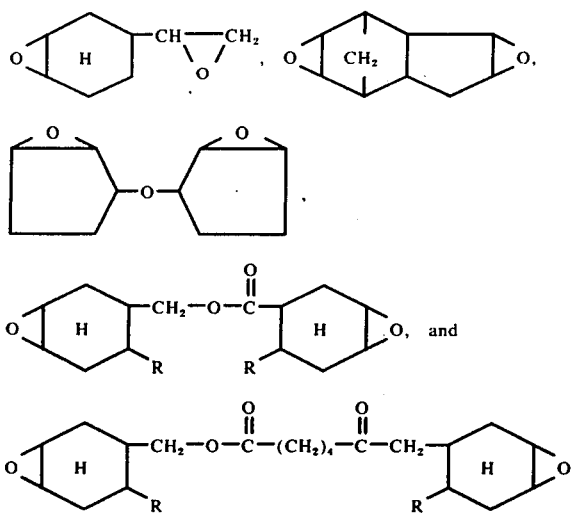

wherein R is a hydrogen or a saturated branched or unbranched $C_1$–$C_6$ alkyl radical or a cycloalkyl radical.

7. A cross-linked polymer according to claim 1 wherein said epoxy compound is the diglycidyl ether of bisphenol A.

8. A cross-linked polymer according to claim 1 wherein said epoxy compound has an epoxy equivalent weight between 225 and 280 gms./equivalent.

9. A cross-linked polymer according to claim 1 wherein said chlorinated or brominated xylyleneglycol-bisallylether is 2,3,4,6-tetrachloro-m-xylyleneglycol-bisallylether.

10. A cross-linked polymer according to claim 1 wherein said chlorinated or brominated xylyleneglycol-bisallylether is 2,3,5,6-tetrachloro-p-xylyleneglycol-bisallylether.

11. A cast article of the cross-linked polymer of claim 1 having a thermal stability of shape in accordance with ISO/R 75 A of 195° to 205° C.

12. A cast article according to claim 1 having a Martens thermal stability of shape (measured on the small standard bar) of 180°–190° C.

13. A cross-linked polymer of claim 1 prepared by copolymerizing 200–500 parts by weight of said chlorinated or brominated xylyleneglycolbisallylether, 100–300 parts by weight of said maleic acid anhydride and 50–400 parts by weight of said epoxy compound.

14. A cross-linked polymer according to claim 1 prepared by cross-linking polymerization of 300–400 parts by weight of said nuclearly brominated or chlorinated xylyleneglycolbisallylether, 150 to 250 parts by weight of said maleic acid anhydride and 100 to 300 parts by weight of said epoxy compound.

15. In a process for the preparation of a cross-linked hardenable resin wherein a composition comprising chlorinated or brominated xylyleneglycolbisallylther and maleic acid anhydride is subjected to a preliminary setting process and thereafter cured, the improvement which comprises including in said composition a 1,2-epoxy compound.

16. A process according to claim 15 wherein said epoxy compound is a diglycidyl ether of a bivalent mono or a polynuclear phenol or a polyvalent alcohol.

17. A process according to claim 15 wherein said epoxy compound has the formula

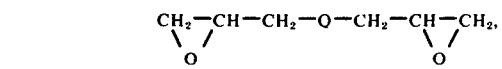

wherein

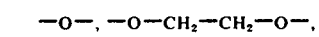

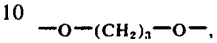

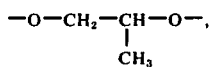

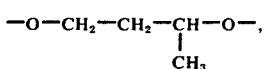

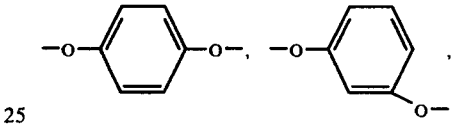

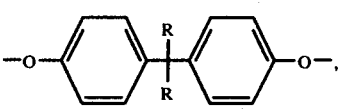

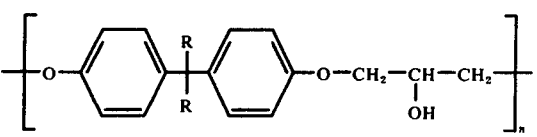

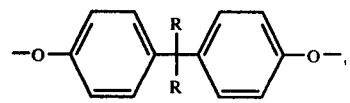

wherein $n = 1$ to 15,

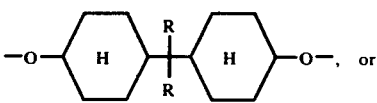

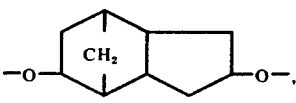

R= hydrogen, $C_1$–$C_6$ alkyl or cycloalkyl.

18. A process according to claim 15 wherein said epoxy compound is a diepoxy compound having two epoxy groups.

19. A process according to claim 15 wherein said epoxy compound is selected from the group consisting of

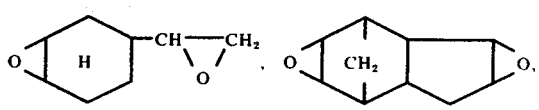

-continued

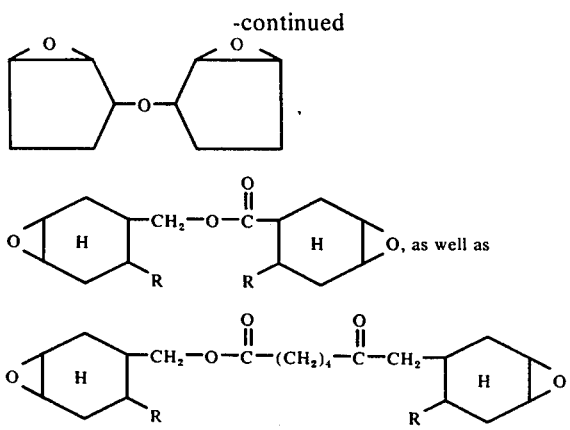

R= hydrogen, $C_1$–$C_6$ alkyl or cycloalkyl.

20. A process according to claim 15 wherein said epoxy compound is the diglycidyl ether of bisphenol A.

21. A process according to claim 15 wherein between 200 and 500 parts of said chlorinated or brominated xylyleneglycolbisallylether are combined with 100 to 300 parts of maleic acid anhydride and 50 to 400 parts by weight of said epoxy compound.

22. A process according to claim 21 wherein between 300 and 400 parts by weight of said chlorinated or brominated xylyleneglycolbisallylether are combined with 150 to 250 parts by weight of maleic acid anhydride and 100 to 300 parts by weight of said epoxy compound.

23. A process according to claim 15 wherein said composition includes a radical initiator.

24. A process according to claim 23 wherein said radical initiator is dibenzoyl peroxide.

25. A process according to claim 23 wherein said radical initiator is methyl ethyl ketone hydroperoxide.

26. A process according to claim 23 wherein said composition additionally contains a resin composition accelerator.

27. A process according to claim 26 wherein said accelerator is selected from the group consisting of dimethylaniline and cobalt octoate.

28. A process according to claim 15 wherein said preliminary setting is performed by melting the chlorinated or brominated xylyleneglycobisallylether, maleic acid anhydride and an epoxy compound at a temperature of 60° to 80° C and there is thereafter added to the composition an initiator and additionally, should the occasion arise, an accelerator and the composition is thereafter formed into a shaped and hardened object.

29. A process according to claim 15 wherein the composition is preliminarily set at a temperature of 50° to 120° C and thereafter cured at a temperature in the range of 150° to 230° C.

30. A shaped and hardened product of the cross-linked polymer of claim 1.

31. A cross-linked polymer according to claim 1 wherein said epoxy compound is a monofunctional or polyfunctional epoxy compound.

32. A process according to claim 15 wherein said epoxy compound is a mono- or polyfunctional epoxy compound.

33. A cross-linked polymer according to claim 32 wherein said epoxy compound is a bisglycidyl ether or ester or trisglycidyl ether or ester.

34. A process according to claim 33 wherein said epoxy compound is a bisglycidyl ether or ester or trisglycidyl ether or ester.

35. A cross-linked polymer according to claim 1 having units of a residue of non-brominated or chlorinated xylyleneglycolbisallyl ether.

36. A cross-linked polymer according to claim 1 where a portion of the brominated or chlorinated xylyleneglycolbisallyl ether units have been replaced by non-brominated xylyleneglycolbisallyl ether.

37. A process according to claim 15 wherein said composition additionally includes a non-chlorinated or brominated xylyleneglycolbisallyl ether.

* * * * *

UNITED STATES PATENT AND TRADEMARK OFFICE
CERTIFICATE OF CORRECTION

PATENT NO. : 4,031,163
DATED : June 21, 1977
INVENTOR(S) : Norbert Vollkommer et al It is certified that error appears in the above-identified patent and that said Letters Patent are hereby corrected as shown below:

Column 2, line 48, "brominate" should read -- brominated --.

Column 3, line 21, "nnecessary" should read -- necessary --.

Column 4, line 61, "67%" should read -- 61% --.

Column 4, line 62, "77%" should read -- 11% --.

Column 4, line 63, "77%" should read -- 17% --.

Column 4, line 65, "73%" should read -- 13% --.

Column 11, line 49, insert -- * -- after "toughness --.

Column 16, line 6, insert -- Q -- after "wherein".

Signed and Sealed this

Eleventh Day of April 1978

[SEAL]

Attest:

RUTH C. MASON
Attesting Officer

LUTRELLE F. PARKER
Acting Commissioner of Patents and Trademarks